United States Patent
Aggarwal et al.

(10) Patent No.: US 11,823,068 B2
(45) Date of Patent: Nov. 21, 2023

(54) PROACTIVE VIRTUAL ASSISTANT

(71) Applicant: Google LLC, Mountain View, CA (US)

(72) Inventors: Vikram Aggarwal, Palo Alto, CA (US); Deniz Binay, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 815 days.

(21) Appl. No.: 16/779,782

(22) Filed: Feb. 3, 2020

(65) Prior Publication Data
US 2020/0175386 A1 Jun. 4, 2020

Related U.S. Application Data

(63) Continuation of application No. 15/381,544, filed on Dec. 16, 2016, now Pat. No. 10,552,742.

(60) Provisional application No. 62/408,105, filed on Oct. 14, 2016.

(51) Int. Cl.
*G06N 5/02* (2023.01)
*H04L 51/02* (2022.01)
*G06Q 10/10* (2023.01)

(52) U.S. Cl.
CPC .............. *G06N 5/02* (2013.01); *G06Q 10/10* (2013.01); *H04L 51/02* (2013.01)

(58) Field of Classification Search
CPC ................................. G06N 5/02; H04L 51/02
See application file for complete search history.

(56) References Cited

U.S. PATENT DOCUMENTS

| | | |
|---|---|---|
| 6,804,332 B1 | 10/2004 | Miner et al. |
| 9,275,641 B1 | 3/2016 | Gelfenbeyn et al. |
| 10,552,742 B2 | 2/2020 | Aggarwal et al. |
| 2002/0178019 A1 | 11/2002 | Anderson et al. |
| 2003/0046421 A1 | 3/2003 | Horvitz et al. |
| 2003/0167167 A1 | 9/2003 | Gong |
| 2005/0054381 A1 | 3/2005 | Lee et al. |
| 2006/0240803 A1 | 10/2006 | Valeriano et al. |
| 2007/0130277 A1 | 6/2007 | Roskind et al. |
| 2008/0171559 A1 | 7/2008 | Frank et al. |
| 2008/0224883 A1 | 9/2008 | Mock |

(Continued)

FOREIGN PATENT DOCUMENTS

| | | |
|---|---|---|
| CN | 101043391 | 9/2007 |
| CN | 102792320 | 11/2012 |

(Continued)

OTHER PUBLICATIONS

Alghamdi, Yousef, and Patrick Seeling. "Activity-based cloud sending: Push services for user device multiplicity." 2015 12th Annual IEEE Consumer Communications and Networking Conference (CCNC). IEEE, 2015. (Year: 2015).*

(Continued)

*Primary Examiner* — Hal Schnee
(74) *Attorney, Agent, or Firm* — Gray Ice Higdon

(57) ABSTRACT

An assistant executing at, at least one processor, is described that determines content for a conversation with a user of a computing device and selects, based on the content and information associated with the user, a modality to signal initiating the conversation with the user. The assistant is further described that causes, in the modality, a signaling of the conversation with the user.

12 Claims, 4 Drawing Sheets

(56) References Cited

U.S. PATENT DOCUMENTS

| | | | |
|---|---|---|---|
| 2012/0265528 | A1 | 10/2012 | Gruber et al. |
| 2013/0159441 | A1 | 6/2013 | Appelman et al. |
| 2013/0275164 | A1 | 10/2013 | Gruber et al. |
| 2013/0275875 | A1* | 10/2013 | Gruber .................... G06F 3/167 |
| | | | 715/728 |
| 2013/0311997 | A1 | 11/2013 | Gruber et al. |
| 2014/0052680 | A1* | 2/2014 | Nitz ........................ G06N 5/04 |
| | | | 706/46 |
| 2014/0052681 | A1 | 2/2014 | Nitz et al. |
| 2014/0119531 | A1 | 5/2014 | Tuchman et al. |
| 2014/0164400 | A1 | 6/2014 | Kruglick |
| 2014/0207469 | A1 | 7/2014 | Dykstra-Erickson et al. |
| 2014/0222436 | A1 | 8/2014 | Binder et al. |
| 2014/0282003 | A1 | 9/2014 | Gruber et al. |
| 2014/0310005 | A1 | 10/2014 | Brown et al. |
| 2014/0317502 | A1 | 10/2014 | Brown et al. |
| 2014/0351744 | A1* | 11/2014 | Jeon .................. H04M 1/72448 |
| | | | 715/781 |
| 2015/0123898 | A1 | 5/2015 | Kim et al. |
| 2015/0141055 | A1* | 5/2015 | Barrand .................. H04W 4/02 |
| | | | 455/456.3 |
| 2015/0163188 | A1 | 6/2015 | Faaborg et al. |
| 2015/0269009 | A1 | 9/2015 | Faaborg et al. |
| 2015/0288745 | A1 | 10/2015 | Moghaddam et al. |
| 2016/0173631 | A1 | 6/2016 | McKay et al. |
| 2016/0180259 | A1* | 6/2016 | Marianko ........... H04L 65/1069 |
| | | | 705/5 |
| 2016/0205253 | A1 | 7/2016 | Williams et al. |
| 2016/0210363 | A1 | 7/2016 | Rambhia et al. |
| 2016/0260431 | A1 | 9/2016 | Newendorp et al. |
| 2016/0335138 | A1 | 11/2016 | Surti et al. |
| 2017/0091612 | A1 | 3/2017 | Gruber et al. |
| 2017/0160813 | A1 | 6/2017 | Divakaran et al. |
| 2017/0289329 | A1 | 10/2017 | Yim et al. |
| 2017/0311053 | A1 | 10/2017 | Ganjam et al. |
| 2017/0337035 | A1 | 11/2017 | Choudhary et al. |
| 2018/0096072 | A1 | 4/2018 | He et al. |

FOREIGN PATENT DOCUMENTS

| | | |
|---|---|---|
| CN | 104335234 | 2/2015 |
| CN | 105027197 | 11/2015 |
| CN | 105122353 | 12/2015 |
| CN | 105247511 | 1/2016 |
| CN | 105264524 | 1/2016 |
| CN | 105830048 | 8/2016 |
| CN | 103226949 | 2/2017 |
| KR | 1020160105995 | 9/2016 |
| WO | 200296126 | 11/2002 |
| WO | 2008012537 | 1/2008 |

OTHER PUBLICATIONS

Gil, Lory; How to teach Siri your family and friends relationships; Retrieved from the Internet <URL: https://www.downloadblog.com/2013/08/01siri-family-friends>; dated Aug. 1, 2013.

Deutsches Patent Office; Summons issued in Application No. 10 2017 120 732.5; 12 pages; dated Jul. 23, 2021.

"How Siri Remembers my Family", [online], Searched on Jun. 10, 2020, the Internet, <URL: http://gonta55.com/2015/09/22/739>; 21 pages Sep. 22, 2015.

China National Intellectual Property Administration; First Office Action issue for Application No. 201710915581.5; 20 pages; dated May 28, 2020.

Great Britain Intellectual Property Office; Examination Report issued in Application No. GB1715898.1 dated Apr. 21, 2020.

China National Intellectual Property Administration; Notice of Allowance issue in Application No. 201710915581.5; 6 pages; dated Jan. 15, 2021.

Intellectual Property Office of Singapore; Notice of Allowance issued in Application No. 10201708331V; 6 pages; dated Dec. 18, 2020.

Intellectual Property Office of Singapore; Invitation to Respond to Written Opinion issue in Application No. 10201904396W; 11 pages; dated Apr. 30, 2020.

German Patent Office; Decision to Grant received in Application No. 10 2017 120 732.5, 11 pages, dated May 9, 2022.

European Patent Office; Communication Pursuant to Article 94(3) issue in U.S. Appl. No. 17/783,682; dated Mar. 23, 2020.

Germany Patent Office; Examination Report issued in Application No. 10 2017 120 732.5; 8 pages; dated Oct. 11, 2021.

Germany Patent Office; Office Action issued in Application No. 10 2017 120 732.5; 11 pages; dated Mar. 24, 2021.

Fu, R.Y. et al. "A framework for device capability on demand and virtual device user experience"; IBM J. Res. & Dev., pp. 635-648, vol. 48, No. 5/6 Sep./Nov. 2004.

Great Britain Intellectual Property Office; Examination Report issued in Application No. GB1715898.1 dated Aug. 8, 2019.

International Bureau of WIPO; International Preliminary Reporton Patentability of Ser. No. PCT/US2017/054147; 7 pages; dated Apr. 25, 2019.

Intellectual Property Office of Singapore; Search Report and Written Opinion issued in Application No. 10201708331V dated Apr. 23, 2018.

European Patent Office; Written Opinion of the International Preliminary Examining Authority of PCT Ser. No. PCT/JS2017/054147; 6 pages; dated Sep. 21, 2018.

European Patent Office; Written Opinion of the International Preliminary Examining Authority of PCT Ser. No. PCT/US2017/052285; 5 pages; dated Aug. 24, 2018.

Irish Patent Office; Search Report issued in Application No. 2017/0177 dated May 11, 2018.

United Kingdom Intellectual Property Office; Examination Report issued in Application No. 1715898.1 dated Mar. 22, 2018.

International Search Report and Written Opinion of PCT Ser. No. PCT/US2017/054147; 12 pages Nov. 28, 2017.

Amazon, "Alexa Skills", retrieved from: https://www.amazon.com/b?ie=UTF&&node=13727911011 on Jan. 26, 2017, 3 pages.

API.AI, "Build Conversation Actions for Google Assistant Users," retrieved from: https://api.ai/blog/2016/12/08/build-conversations-actions-for-the-google-assistant/, Dec. 8, 2016, 2 Pages.

Badcock, "First Alexa Third-Party Skills Now Available for Amazon Echo," retrieved from: https://developer.amazon.com/blogs/post/TxC2VHKFEIZ9SG/first-alexa-third-party-skills-now-available-for-amazon-echo, Aug. 17, 2015, 5 pages.

Newman, "It's On! 2017 is the Year The Virtual Assistant Wars Get Real," retrieved from: https://www.fastcompany.com/3066831/its-on-2017-is-the-virtual-assistant-wars-get-real, Dec. 28, 2016. 9 Pages.

Intellectual Property Office of Singapore; Notice of Grant and Examination Report issued in Application No. 10201708331V dated Mar. 18, 2019.

Huang, J.; What is Siri and how does it work?; Retrieved from the Internet: https://zhidao.baidu.com/question/134968451412138605.html; 4 pages; dated Oct. 23, 2013.

Weeratunga, A. M. et al.; Project Nethra—An Intelligent Assistant for the Visually Disabled to Interact with Internet Services; IEEE 10th Conference on Industrial and Information Systems (ICIIS); 5 pages; dated Dec. 2015.

\* cited by examiner

PROACTIVE VIRTUAL ASSISTANT

BACKGROUND

Some computing platforms may provide a user interface from which a user can chat, speak, or otherwise communicate with a virtual, computational assistant (e.g., also referred to as "an intelligent personal assistant" or simply as an "assistant") to cause the assistant to output useful information, respond to a user's needs, or otherwise perform certain operations to help the user complete a variety of real-world or virtual tasks. For instance, a computing device may receive, with a microphone, voice input (e.g., audio data) that corresponds to a user utterance. An assistant executing, at least in part, at the computing device may analyze the voice input and attempt to satisfy the utterance by outputting useful information based on the utterance, responding to a user's needs indicated by the utterance, or otherwise perform certain operations to help the user complete a variety of real-world or virtual tasks based on the utterance.

SUMMARY

In one example, the disclosure is directed to a method that includes determining, by an assistant executing at one or more processors, content for a conversation with a user of a computing device, selecting, by the assistant, based on the content and information associated with the user, a modality to signal initiating the conversation with the user, and causing, by the assistant, in the modality, a signaling of the conversation with the user.

In another example, the disclosure is directed to a system that includes one or more processors and a memory comprising instructions that when executed cause the one or more processors to determine content for a conversation with a user of a computing device, select, based on the content and information associated with the user, a modality to signal initiating the conversation with the user, and cause, in the modality, a signaling of the conversation with the user.

In another example, the disclosure is directed to a computer-readable storage medium including instructions that when executed cause one or more processors of a system to determine content for a conversation with a user of a computing device, select, based on the content and information associated with the user, a modality to signal initiating the conversation with the user, and cause, in the modality, a signaling of the conversation with the user.

In another example, the disclosure is directed to a system comprising means for determining, by an assistant executing at one or more processors, content for a conversation with a user of a computing device, means for selecting, by the assistant, based on the content and information associated with the user, a modality to signal initiating the conversation with the user, and means for causing, by the assistant, in the modality, a signaling of the conversation with the user.

The details of one or more examples are set forth in the accompanying drawings and the description below. Other features, objects, and advantages of the disclosure will be apparent from the description and drawings, and from the claims.

DETAILED DESCRIPTION

Figure 1:
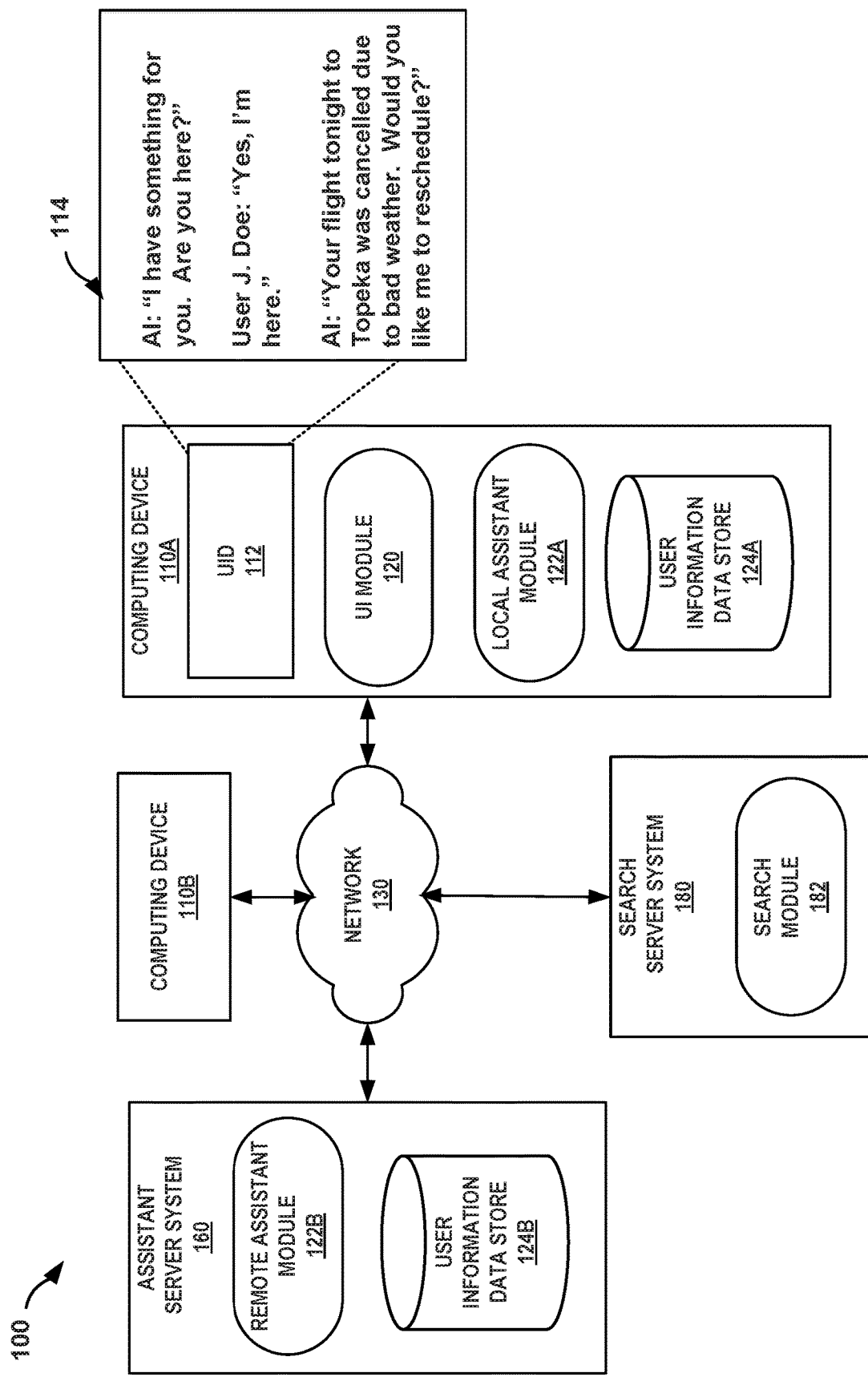
FIG. 1 is a conceptual diagram illustrating an example system that executes an example virtual assistant, in accordance with one or more aspects of the present disclosure.

In general, techniques of this disclosure may enable a virtual, computational assistant (e.g., also referred to as "an intelligent assistant" or simply as an "assistant") to notify, without user prompting, information that may be of interest to the user. The assistant may proactively guide the user to interesting information, even in instances where there was no explicit user request for the information. For instance, in response to the assistant determining that a flight reservation for the user indicates that the flight is delayed, the assistant may notify the user without the user requesting that the assistant provide information about the flight status.

The assistant may determine a correct modality to inform a user of information that is meaningful to the user. Examples of modality may include a voice or audible notification, a text notification, triggering a light indicator on a device, highlighting content inside an assistant app (e.g. in a dashboard view), or another modality. With explicit permission from the user, the assistant may automatically maintain or have access to information associated with the user. Using such information, the assistant may identify information that is worthy of proactively outputting to the user. For instance, the assistant may proactively notify a user of a flight delay but refrain from proactively notifying the user about a trivial package delivery and instead wait to notify the user of the package delivery until the user chooses to interact with the assistant.

The assistant may determine an appropriate surface (e.g., computing device) to convey information in a useful manner. Examples of surfaces may include, a mobile device, tablet, laptop computer, desktop computer, multimedia device (e.g., television, screen, projector, etc.), speaker device, automobile platform, or other surfaces. For example, the assistant may determine, based on device usage history, a user location, a state of the user devices, and other signals, a home computing device that a user is likely to be using or have access to when the user is at a home location. In the example, the assistant may notify the user on the home computing device during a time of day that the user is likely to be home.

The assistant may automatically select a user experience (e.g., a voice user experience, visual user experience, etc.) to inform a user of information in a useful manner. For example, the assistant may select a user experience that provides a length or detail level of a notification based on an importance of the notification or content being delivered to the user. For instance, the assistant may generate a longer notification (e.g., Jon, your flight to Topeka is delayed by four hours. The new departure time is 7 pm.") as one type of user experience for an important notification and a shorter message (e.g., your package arrives tomorrow.") as a different type of user experience for a trivial notification.

The assistant may generate a single notification representing multiple notifications and multiple types of user experiences, based on an importance of the notifications. For instance, the assistant may collapse multiple notifications into a single notification (e.g., Jon, you have four alerts. Your package is on time, your flight is still on time, and your credit card was paid.") for trivial notifications. In the example, if the assistant determines that one particular notification is more important than other notifications, the assistant may optionally use one type of user experience (e.g., a longer message) to represent the most important notification compared with the user experiences associated with the other, less important notifications by collapsing the other notifications. For instance, the assistant may output "Your package is on time" to direct a user to information regarding a package delivery in response to determining that the package delivery notification is of less importance, and the assistant may output "Your package containing toothpicks will be on time, and should reach at 2 pm tomorrow" when the assistant determines that the notification about the package delivery is more important.

The assistant may only maintain or have access to information associated with the user after first receiving explicit permission from the user to do so. Thus, the user may have complete control over how the assistant collects and uses information about the user. Before the assistant stores personal information, the assistant may encrypt or otherwise treat the information to remove the actual identity of the user, so that personally-identifiable information is removed while being stored. The assistant may provide a way for the user to modify or remove information maintained by the assistant. In this way, the user may have complete control over the information being retained by the assistant.

Once the assistant has received permission to maintain or have access to information associated with the user, the assistant can immediately use that information to determine a correct modality to inform a user of information that is meaningful to the user. If there is no ongoing task, the assistant may direct the user to the information to help the user in the future. For example, the assistant may create information for a restaurant reservation scheduled through the assistant. In the example, the assistant may direct the user to information about a change to the reservation (e.g., rescheduling of the reservation, cancellation of the reservation, etc.). In this manner, the user may be made aware of meaningful information that may cause the assistant to seem more useful and desirable to the user. In this way, the example assistant may proactively direct a user to meaningful information that the example assistant infers will likely be useful and desirable to the user even if the user never requests or prompts the assistant for the information.

Throughout the disclosure, examples are described where a computing device and/or a computing system analyzes information (e.g., context, locations, communications, contacts, chat conversations, voice conversations, etc.) associated with a computing device and a user of a computing device, only if the computing device receives permission from the user of the computing device to analyze the information. For example, in situations discussed below, before an assistant executing at a computing device or computing system can collect or may make use of information associated with a user, the user may be provided with an opportunity to provide input to control whether the assistant (or other programs or features of the computing device and/or computing system) can collect and make use of user information or to dictate whether and/or how to computing devices and/or computing systems may receive content that may be relevant to the user. In addition, certain data may be encrypted and/or treated in one or more ways before it is stored or used by the assistant or underlying computing device and/or computing system, so that personally-identifiable information is removed. For example, a user's identity may be treated so that no personally identifiable information can be determined about the user, or a user's geographic location may be generalized where location information is obtained (such as to a city, ZIP code, or state as opposed to a coordinate location or physical address), so that a particular location of a user cannot be determined. Thus, the user may have control over how information is collected about the user and used by the assistant and the underlying computing device and computing system that executes the assistant.

FIG. 1 is a conceptual diagram illustrating an example system that executes an example virtual assistant, in accordance with one or more aspects of the present disclosure. System 100 of FIG. 1 includes assistant server system 160 in communication, via network 130, with search server system 180 and computing devices 110A and 110B (collectively, computing devices 110). Although system 100 is shown as being distributed amongst assistant server system 160, search server system 180, and computing devices 110, in other examples, the features and techniques attributed to system 100 may be performed internally, by local components of computing devices 110. Similarly, assistant server system 160 may include certain components and perform various techniques that are otherwise attributed in the below description to search server system 180 and/or computing devices 110. Although FIG. 1 illustrates two computing devices 110, any suitable number of one or more computing devices 110 may be used.

Network 130 represents any public or private communications network, for instance, cellular, Wi-Fi, and/or other types of networks, for transmitting data between computing systems, servers, and computing devices. Assistant server system 160 may exchange data, via network 130, with computing devices 110 to provide a virtual assistant service that is accessible to computing devices 110 when computing devices 110 are connected to network 130. Assistant server system 160 may exchange data, via network 130, with search server system 180 to access a search service provided by search server system 180. Computing devices 110 may exchange data, via network 130, with search server system 180 to access the search service provided by search server system 180.

Network 130 may include one or more network hubs, network switches, network routers, or any other network equipment, that are operatively inter-coupled thereby providing for the exchange of information between server systems 160 and 180 and computing devices 110. Computing devices 110, assistant server system 160, and search server system 180 may transmit and receive data across network 130 using any suitable communication techniques. Computing devices 110, assistant server system 160, and search server system 180 may each be operatively coupled to network 130 using respective network links. The links coupling computing devices 110, assistant server system 160, and search server system 180 to network 130 may be Ethernet or other types of network connections and such connections may be wireless and/or wired connections.

Assistant server system 160 and search server system 180 represent any suitable remote computing systems, such as one or more desktop computers, laptop computers, mainframes, servers, cloud computing systems, etc. capable of sending and receiving information both to and from a network, such as network 130. Assistant server system 160 hosts (or at least provides access to) a virtual assistant service. Search server system 180 hosts (or at least provides access to) a search service. In some examples, assistant server system 160 and search server system 180 represent cloud computing systems that provide access to their respective services via a cloud. In some examples, search server system 180 may be configured to access and/or store public information. Examples of public information may include, but are not limited to, weather or traffic conditions, news, stock prices, sports scores, user schedules, transportation schedules, retail prices, public contextual information (e.g., temperature at a location, a shop opening and closing hours, etc.), or other public information.

Computing devices 110 represent individual mobile or non-mobile computing device. Examples of computing devices 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant device), a personal digital assistants (PDA), a gaming system, a media player, an e-book reader, a mobile television platform, an automobile navigation or infotainment system, or any other type of mobile, non-mobile, wearable, and non-wearable computing device configured to execute or access a virtual assistant and receive information via a network, such as network 130.

Assistant server system 160 and/or search server system 180 may communicate with computing devices 110 via network 130 to give computing devices 110 access the virtual assistant service provided by assistant server system 160 and/or to provide computing devices 110 access to the search service provided by search server system 180. In the course of providing virtual assistant services, assistant server system 160 may communicate with search server system 180 via network 130 to obtain search results for providing a user of the virtual assistant service information to complete a task.

In the example of FIG. 1, assistant server system 160 includes remote assistant module 122B and user information data store 124B. Remote assistant module 122B may maintain user information data store 124B as part of a virtual assistant service that assistant server system 160 provides via network 130 (e.g., to computing device 110A). Computing device 110A includes user interface device (UID) 112, user interface (UI) module 120, local assistant module 122A, and user information data store 124A. Computing device 110B may include similar devices and/or modules. Local assistant module 122A may maintain user information data store 124A as part of a virtual assistant service that executes locally at computing device 110A. Remote assistant module 122B and local assistant module 122A may be referred to collectively as assistant module 122. Local data store 124A and remote data store 124B may be referred to collectively as data stores 124A and 124B.

Modules 120, 122A, 122B, and 182 may perform operations described using software, hardware, firmware, or a mixture of hardware, software, and firmware residing in and/or executing at one of computing device 110A, assistant server system 160, or search server system 180. Computing device 110A, assistant server system 160, and search server system 180 may execute modules 120, 122A, 122B, and 182 with multiple processors or multiple devices. Computing device 110A, assistant server system 160, and search server system 180 may execute modules 120, 122A, 122B, and 182 as virtual machines executing on underlying hardware. Modules 120, 122A, 122B, and 182 may execute as one or more services of an operating system or computing platform. Modules 120, 122A, 122B, and 182 may execute as one or more executable programs at an application layer of a computing platform.

UID 112 of computing device 110A may function as an input and/or output device for computing device 110A. UID 112 may be implemented using various technologies. For instance, UID 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology.

UID 112 may function as an input device using microphone technologies, infrared sensor technologies, or other input device technology for use in receiving user input. For example, UID 112 may detect, using built-in microphone technology, voice input that UI module 120 and/or local assistant module 122A processes for completing a task. As another example, UID 112 may include a presence-sensitive display that may receive tactile input from a user of computing device 110A. UID 112 may receive indications of tactile input by detecting one or more gestures from a user (e.g., the user touching or pointing to one or more locations of UID 112 with a finger or a stylus pen).

UID 112 may function as output (e.g., display) device and present output to a user. UID 112 may function as an output device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110A. UID 112 may function as output device using speaker technologies, haptic feedback technologies, or other output device technology for use in outputting information to a user. UID 112 may present a user interface (e.g., user interface 114) related to a virtual assistant provided by local assistant module 122A and/or remote assistant module 122B. UID 112 may present a user interface related to other features of computing platforms, operating systems, applications, and/or services executing at and/or accessible from computing device 110A (e.g., e-mail, chat, online services, telephone, gaming, etc.).

UI module 120 may manage user interactions with UID 112 and other components of computing device 110A including interacting with assistant server system 160 so as to provide assistant services via UID 112. UI module 120 may cause UID 112 to output a user interface, such as user interface 114 (or other example user interfaces), as a user of computing device 110A views output and/or provides input at UID 112. UI module 120 and UID 112 may receive one or more indications of input (e.g., voice input, gesture input, etc.) from a user as the user interacts with the user interface, at different times and when the user and computing device 110A are at different locations. UI module 120 and UID 112 may interpret inputs detected at UID 112 and may relay information about the inputs detected at UID 112 to local assistant module 122A and/or one or more other associated platforms, operating systems, applications, and/or services executing at computing device 110A, for example, to cause computing device 110A to perform functions.

UI module 120 may receive information and instructions from one or more associated platforms, operating systems, applications, and/or services executing at computing device 110A and/or one or more remote computing systems, such as server systems 160 and 180. In addition, UI module 120 may act as an intermediary between the one or more associated platforms, operating systems, applications, and/or services executing at computing device 110A, and various output devices of computing device 110A (e.g., speakers, LED indicators, audio or haptic output device, etc.) to produce output (e.g., a graphic, a flash of light, a sound, a haptic response, etc.) with computing device 110A.

Search module 182 may execute a search for information determined to be relevant to a search query that search module 182 automatically generates (e.g., based on contextual information associated with computing device 110A) or that search module 182 receives from assistant server system 160 or computing device 110A (e.g., as part of a task that a virtual assistant is completing on behalf of a user of computing device 110A). Search module 182 may conduct an Internet search based on a search query to identify information (e.g., weather or traffic conditions, news, stock prices, sports scores, user schedules, transportation schedules, retail prices, etc.) related to the search query from amongst from a variety of information sources (e.g., either stored locally or remote to search server system 180). After executing a search, search module 182 may output the information returned from the search (e.g., the search results) to assistant server system 160 or computing device 110A.

In the example of FIG. 1, user interface 114 is a graphical user interface associated with a virtual assistant service accessed by computing device 110A (e.g., provided by local assistant module 122A and/or remote assistant module 122B of assistant server system 160). User interface 114 may in some examples be an audible user interface. As shown in FIG. 1, user interface 114 shows text of a conversation between a user of computing device 110A and a virtual assistant executing at or accessible to computing device 110A. User interface 114 may include virtual assistant information in various forms such as audible sound, vibrations, text, graphics, content cards, images, etc. UI module 120 may cause UID 112 to output user interface 114 based on data UI module 120 receives via network 130 from assistant server system 160. UI module 120 may receive information (e.g., audio data, text data, image data, etc.) for presenting user interface 114 as input from assistant server system 160 and/or local assistant module 122A, along with instructions from assistant server system 160 and/or local assistant module 122A for presenting the information within user interface 114 at UID 112.

Local assistant module 122A of computing device 110A and remote assistant module 122B of assistant server system 160 may each perform similar functions described herein for executing an assistant that is configured to proactively direct, automatically and without requiring user interactions, a user of a computing device to meaningful or otherwise useful information that the user may be interested in at a current time. Remote assistant module 122B and user information data store 124B represent server-side or cloud implementations of an example virtual assistant whereas local assistant module 122A and user information data store 124A represent a client-side or local implementation of the example virtual assistant.

Modules 122A and 122B may each include respective software agents configured to execute as intelligent personal assistants that can perform tasks or services for an individual, such as a user of computing device 110A. Modules 122A and 122B may perform these tasks or services based on user input (e.g., detected at UID 112), location awareness (e.g., based on context), and/or the ability to access other information (e.g., weather or traffic conditions, news, stock prices, sports scores, user schedules, transportation sched-
ules, retail prices, etc.) from a variety of information sources (e.g., either stored locally at computing device 110A, assistant server system 160, or obtained via the search service provided by search server system 180). Modules 122A and 122B may perform artificial intelligence and/or machine learning techniques to automatically identify and complete one or more tasks on behalf of a user.

The respective assistant provided by remote assistant module 122B and local assistant module 122A may, e.g., in the course of executing operations to support conversations with a user of computing device 110A, automatically maintain information associated with a user, or pointers to locations of information associated with a user (e.g., stored by information sources located at computing devices 110, server systems 160 or 180, or by any other server or device located elsewhere on network 130). Modules 122B and 122A may maintain the information, or pointers to information, associated with the user as, respectively, user information data store 124B and user information data store 124A. For example, information associated with a user may be information obtained, with permission from the user, during a conversation between the user and the assistant, calendar information, contact information, user interests, user preferences, and any other information associated with a user that may be used by modules 122 to proactively direct the user to meaningful information. Examples of sources of information associated with the user may include, but are not limited to, intelligence built in an e-mail system, user interactions with assistant modules 122A and 122B, usage on devices (e.g., 110) associated with the user, or other sources of information.

Assistant modules 122A and 122B may maintain user information data stores 124A and 124B as part of a virtual assistant service that assistant modules 122A and 122B together, or separately, provide to computing device 110A. Data stores 124A and 124B may enable the assistant executed by assistant modules 122A and 122B to quickly access the personal information to complete a real-world task, a virtual task, or otherwise respond to immediate and/or future needs of the user of computing device 110A. For ease of description, the techniques of this disclosure are described primarily from the perspective of being performed by local assistant module 122A.

The term "conversation" as used throughout this specification refers to regular interactions between a user of a computing device and an assistant executing at or accessible from the computing device as opposed to interactions that might occur during initial set up, installation, first time use, etc. In other words, the conversation occurs during everyday use of the assistant, by the user, as the user is performing a task other than setting up the assistant. Conversation as used herein does not refer to a user answering questions as part setting up an app or providing in preset fields of a user interface.

In operation, local assistant module 122A may proactively determine content for a conversation with a user of computing device 110A. For instance, assistant module 122 may automatically, without requiring user interaction, identify from information associated with the user (e.g., an e-mail confirmation, a text message confirmation, data from a third-party application confirming a flight reservation, etc.) and/or from public information (e.g., flight data accessible using network 130), that a flight reservation for the user has been cancelled due to severe weather.

Rather than using a single modality (e.g., visual notification) that signals an amalgamation of both trivial and interesting information, assistant module 122 may select, based on the content and information associated with the user, a particular modality to signal the conversation with the user that is most likely to gain the attention of the user without being overly intrusive or annoying. In the example where content indicates that a flight reservation has been cancelled and information associated with the user indicates that the user is unaware (e.g., an e-mail indicating the flight reservation has been canceled has not been read), assistant module 122 may select a particular modality as an audible notification that is more pressing than a visible notification. In this way, assistant module 122 may select an appropriate modality for alerting the user to information that avoids overwhelming the user with an amalgamation of notifications for trivial and meaningful information.

In an effort to proactively provide useful information to the user and prevent inadvertent outputting of personal or sensitive information, assistant module 122 may cause a signaling, in the modality, without prompting by the user, of the conversation with the user to provide the content to the user without actually providing the specific content (e.g., that may be personal or private in nature). For example, assistant module 122 may cause UID 112 to output an audible notification of "I have something for you. Are you here?" to signal initiating a conversation with the user to provide the content to the user. Additionally, or alternatively, assistant module 122 may cause UID 112 to output for display a visible notification of "I have something for you. Are you here?" to signal initiating the conversation with the user to provide the content to the user. In any case, the output by UID 112 may proactively signal the user that meaningful information is available.

In some examples, assistant module 122 may determine whether a user has received the signaling (e.g., audible notification, visible notification, etc.) of the conversation. For instance, assistant module 122 may determine that the user has received an audible notification when the assistant module 122 receives an indication of consent from the user (e.g., a microphone of UID 112 determining an utterance indicating "Yes, I'm here"). In another instance, assistant module 122 may determine that the user has received a visible notification when the assistant module 122 receives an indication that the user has activated a display of UID 112 and/or has interacted with UID 112 to indicate consent (e.g., swipe or tap a consent indicator).

In response to receiving the indication of consent from the user (e.g., a microphone of UID 112 determining an utterance indicating "Yes, I'm here"), assistant module 122 may cause UID 112 to output an audible notification of "Your flight tonight to Topeka was cancelled due to bad weather. Would you like me to reschedule?" to proactively initiate a conversation with the user that provides the content (e.g., the information that the flight was cancelled) to the user and to optionally, without prompting by the user, suggest an action (e.g., reschedule the flight to Topeka). In this way, assistant module 122 may proactively direct the user to meaningful information without necessarily inundating the user with trivial information.

Assistant module 122 may restrict the signaling of content to specific content to ensure that users find value in the content. For example, based on information stored in user information data store 124, assistant module 122 may determine that a particular package delivery is trivial. For instance, in response to assistant module 122 determining that a particular package delivery is frequently ordered, has low value compared to other orders by the user, or based on other information stored in information data store 124, assistant module 122 may be configured to decrease a personalized ranking for notification related to the particular package delivery. Said differently, assistant module 122 may refrain from causing UI module 120 to output audio via UID 112 notifications regarding a trivial package delivery because the user is not likely to not find the notification to be useful. However, assistant module 122 may choose to notify the user on a status for a high-value package. For instance, assistant module 122 may cause UI module 120 to output an audible notification via UID 112 regarding a shipping delay in a camera that is relatively expensive compared to previous items purchased by the user.

Assistant module 122 may determine a surface (e.g., a computing device of computing devices 110) to appropriately signal the notification to a user. For example, assistant module 122 may maintain a list of surfaces (e.g., computing devices 110) that are associated with the user and configured to operate assistant module 122. In the example, assistant module 122 may identify a surface from the list of surfaces based on information stored in user information data store 124. Said differently, assistant module 122 may select a surface for signaling the conversation to the user in the modality based on content for a conversation with the user, and information associated with the user (e.g., information stored in user information data store 124). For instance, assistant module 122 may identify a surface by examining the usage on each device, the time of day, the best known location of the user, and the capability of the device, or other information. More specifically, for instance, assistant module 122 may choose not to notify a user on a home-based device when assistant module 122 determines that the user is likely to be away from home (e.g., based on a flight reservation on a calendar, or in e-mail, or during a commute time when a user is typically away from home, etc.). Additionally, or alternatively, assistant module 122 may choose not to notify a user on a device when assistant module 122 determines that the user is not likely to notice an indication on the device because the user has not interacted with the device often (e.g., a user has not refreshed a feed on the device for many months). Said differently, assistant module 122 may to notify a user on computing device 110B when assistant module 122 determines that computing device 110B was the most recently used computing device 110. In this way, assistant module 122 may signal initiating a conversation to a user at an appropriate surface such that interactions with the assistant module 122 seem more useful and desirable to the user.

Assistant module 122 may identify a surface from the list of surfaces according to a capability of the surface. That is, assistant module 122 may determine whether a surface is configured to signal initiating a conversation in the modality and based on a determination that a particular surface is configured to signal initiating the conversation in the modality, assistant module 122 may select that particular surface for signaling a notification to the user in the modality. For instance, assistant module 122 may choose to notify (e.g., signal) a user on computing device 110B when assistant module 122 determines that computing device 110B has a capability to output a notification that requires showing pixels on a screen (e.g., "Here is your flight reservation.). Assistant module 122 may identify a surface from the list of surfaces according to an availability of the surface. For example, assistant module 122 may refrain from selecting a speaker surface that is associated with a home of the user when assistant module 122 determines that the user is at a work location of the user.

Assistant module 122 may be configured to select a modality (e.g., audible notification, text or visual notification, light indictor, etc.) to appropriately signal initiating a conversation to a user. For example, assistant module 122 may select a modality based on a capability of a surface. For instance, assistant module 122 may select a modality as an audible notification when using a particular device that cannot output a text or visual notification. Additionally, or alternatively, assistant module 122 may select a modality based on based on a ranking of the content. For example, assistant module 122 may select, for output by an audio surface, a modality using a blinking light of the audio surface for low ranking content. In the example, in response to seeing the blinking lights, the user may ask the device "Ok, Assistant, what's up?", or "Ok, Assistant, what do you have for me?" or tap on the device to hear the content. In the example, however, assistant module 122 may select, for output by the audio surface, a modality as an audible notification using a speaker of the audio surface for high ranking content.

Assistant module 122 may signal a user after outputting a reactive response to the inquiry (e.g., at the end of a reactive interaction of available information). For example, assistant module 122 may receive an indication (e.g., data or information indicative of) of an inquiry from the user. For instance, UI module 120 may receive an audio or text input from a user to "Set an alarm for 5 pm." In the example, assistant module 122 may output an initial conversation that indicates a reactive response to the inquiry from the user in response to receiving the indication of the inquiry from the user. In the example, after outputting the initial conversation that indicates the reactive response to the inquiry from the user, assistant module 122 may cause a signaling of a subsequent conversation with the user to provide the content to the user. For instance, in response assistant module 122 may cause UI module 120 to output audio or text via UID 112 "I have set an alarm for 5 pm tomorrow. I have a notification for you. Would you like to hear it?" The user may speak the word "Yes" and computing device 110A may receive the spoken word 'yes' as an additional voice input via UID 112. Based on the indication of the additional input, local assistant module 122A may signal the content by causing UI module 120 to output audio or text via UID 112 "Your flight to Topeka has been delayed by four hours. The new departure time is 11 pm." In this manner, assistant module 122 may ensure that a user get meaningful information both proactively and during the course of normal conversation.

Assistant module 122 may prompt a user that information is available without divulging the content. For example, assistant module 122 may cause UI module 120 to output an indication that information is available using blinking lights. In response to no user input for a duration (e.g., a minute), assistant module 122 may cause UI module 120 to output audio or text via UID 112 "Viki, I have something for you. Are you here?". The user may state "Yes, I'm here." In response assistant module 122 may cause UI module 120 to output audio or text via UID 112 "Your flight tonight to Topeka was cancelled due to bad weather. Would you like me to reschedule?". In some examples, assistant module 122 may prompt a user that information is available without divulging the content based on a ranking of the notification. For instance, assistant module 122 may only signal content that has a high personalized and/or generalized ranking.

Assistant module 122 may determine whether to output a notification of content inline (e.g., in a chat UI that a user is using) or through other notification mechanisms (e.g., a notification shade in a platform, widgets, etc.). For example, assistant module 122 may output a notification inline or through other notification mechanisms based on a ranking of the notification. For instance, assistant module 122 may output a notification, on a mobile client, inline when a ranking for content signaled by the notification is high. Additionally, or alternatively, assistant module 122 may output a notification inline or through other notification mechanisms based on information in user information data store 124A.

Assistant module 122 may automatically select a voice user experience to inform a user of content in a useful manner. For example, assistant module 122 may select a length or detail level of a notification of content based on a ranking of the content. For instance, assistant 122 may generate a shorter notification (e.g., "Sports team X won.") when a ranking for content signaled by the notification is low and a longer and/or more detailed notification (e.g., "Sports team X defeated sports team Y, player A scored 2 points, player B scored C points, player D was injured"). Additionally, or alternatively, assistant module 122 may signal a set of notifications based on a ranking of the content for each notification of the set of notifications. For instance, assistant module 122 may collapse multiple notifications into a single message (e.g., "Sports team X won. Your package is on time, your flight is still on time, and your credit card was paid.") when a ranking for each content signaled by the notification is low. While other assistants may need to be directed to meaningful information using specific inquiries, an example assistant according to the present disclosure may be able to ascertain what information is meaningful to a user based on information associated with the user, without having to be directed to the information. Because the example assistant proactively directs the user to meaningful information, the user need not spend time directing the assistant using specific inquiries. An example assistant according to the present disclosure may therefore complete tasks more quickly and/or respond to a user faster than other assistants. By proactively directing the user to meaningful information, the assistant may seem natural, less awkward, and more desirable to the user.

Among the several benefits provided by the aforementioned approach are: (1) the processing complexity and time for a device to act may be reduced by proactively directing the user to the meaningful information rather than relying on specific inquiries from the user; (2) meaningful information and information associated with the user may be stored locally reducing the need for complex and memory-consuming transmission security protocols on the user's device for the private data; (3) because the example assistant directs the user to information, fewer specific inquiries may be requested by the user, thereby reducing demands on a user device for query rewriting and other computationally complex data retrieval; and (4) network usage may be reduced as the data that the local assistant module needs to respond to specific inquires may be reduced as a quantity of specific inquires is reduced.

Figure 2:
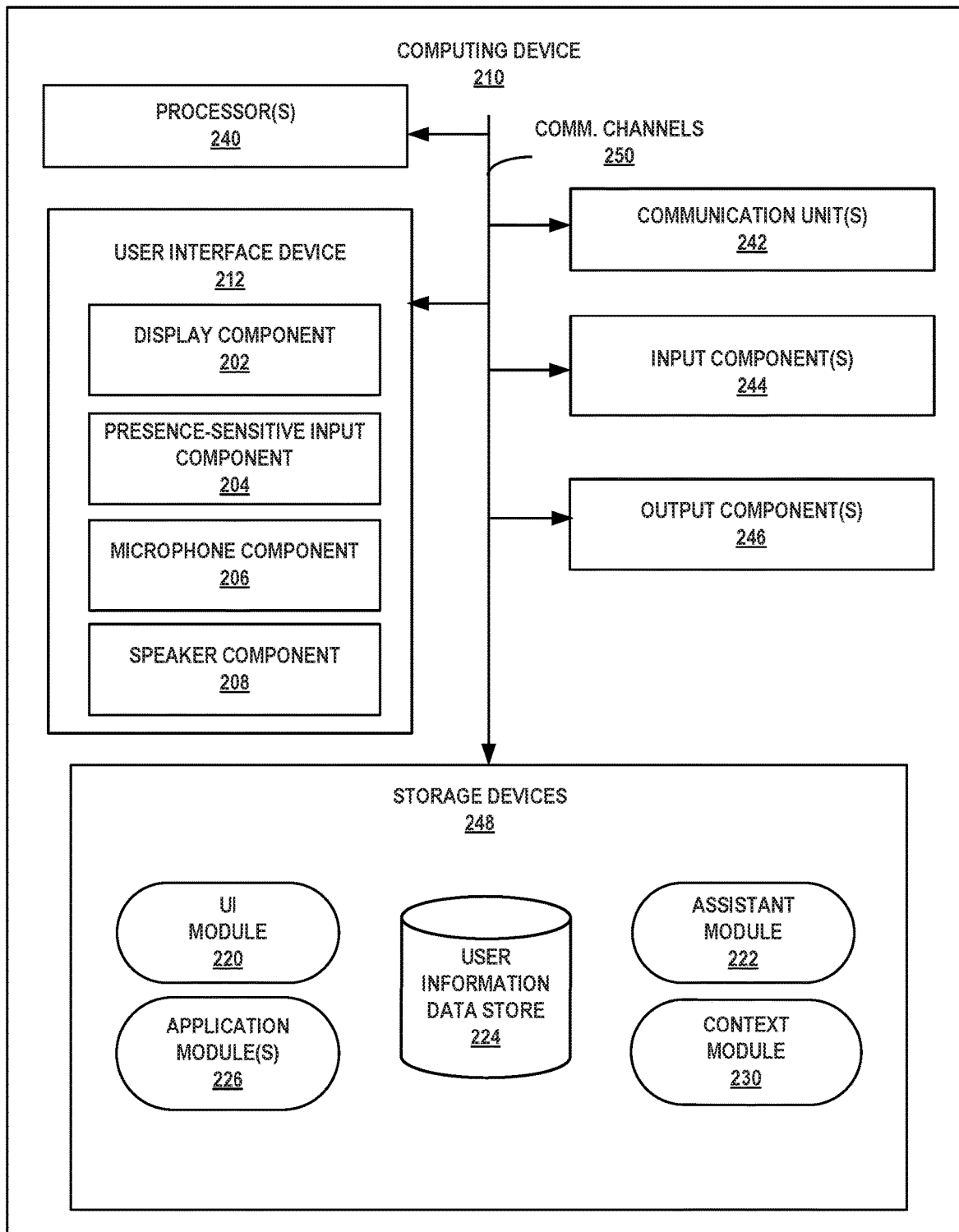
FIG. 2 is a block diagram illustrating an example computing device that is configured to execute an example virtual assistant, in accordance with one or more aspects of the present disclosure.

FIG. 2 is a block diagram illustrating an example computing device that is configured to execute an example virtual assistant, in accordance with one or more aspects of the present disclosure. Computing device 210 of FIG. 2 is described below as an example of computing device 110A and/or 110B of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface device (USD) 212, one or more processors 240, one or more communication units 242, one or more input components 244, one or more output components 246, and one or more storage components 248. USD 212 includes display component 202, presence-sensitive input component 204, microphone component 206, and speaker component 208. Storage components 248 of computing device 210 include UI module 220, assistant module 222, one or more application modules 226, user information data store 224, and context module 230.

One or more processors 240 may implement functionality and/or execute instructions associated with computing device 210 to proactively guide the user to interesting information. Examples of processors 240 include application processors, display controllers, auxiliary processors, one or more sensor hubs, and any other hardware configure to function as a processor, a processing unit, or a processing device. Modules 220, 222, 226, and 230 may be operable by processors 240 to perform various actions, operations, or functions of computing device 210. For example, processors 240 of computing device 210 may retrieve and execute instructions stored by storage components 248 that cause processors 240 to perform the operations modules 220, 222, 226, and 230. The instructions, when executed by processors 240, may cause computing device 210 to proactively guide the user to interesting information.

UI module 220 may include all functionality of UI module 120 of computing device 110A of FIG. 1 and may perform similar operations as UI module 120 for managing a user interface (e.g., user interface 114) that computing device 210 provides at USD 212 for example, for facilitating interactions between a user of computing device 110A and assistant module 222. For example, UI module 220 of computing device 210 may receive information from assistant module 222 that includes instructions for outputting (e.g., displaying or playing audio) an assistant user interface (e.g., user interface 114). UI module 220 may receive the information from assistant module 222 over communication channels 250 and use the data to generate a user interface. UI module 220 may transmit a display or audible output command and associated data over communication channels 250 to cause UID 212 to present the user interface at UID 212.

Assistant module 222 may include all functionality of local assistant module 122A of computing device 110A of FIG. 1 and may perform similar operations as local assistant module 122A for providing an assistant. In some examples, assistant module 222 may execute locally (e.g., at processors 240) to provide assistant functions. In some examples, assistant module 222 may act as an interface to a remote assistant service accessible to computing device 210. For example, assistant module 222 may be an interface or application programming interface (API) to remote assistant module 122B of assistant server system 160 of FIG. 1.

One or more application modules 226 represent all the various individual applications and services executing at and accessible from computing device 210 that may be accessed by an assistant, such as assistant module 222, to provide user with information and/or perform a task. Numerous examples of application modules 226 may exist and include, a fitness application, a calendar application, a search application, a map or navigation application, a transportation service application (e.g., a bus or train tracking application), a social media application, a game application, an e-mail application, a chat or messaging application, an Internet browser application, or any and all other applications that may execute at computing device 210.

Context module 230 may collect contextual information associated with computing device 210 to define a context of computing device 210. Specifically, context module 210 may be used by assistant module 222 to define a context of computing device 210 that specifies the characteristics of the physical and/or virtual environment of computing device 210 and a user of computing device 210 at a particular time. Assistant module 222 may proactively provide information to or perform tasks on behalf of the user of computing device 210 based on the contextual information associated with computing device 210 and the defined context of computing device 210.

As used throughout the disclosure, the term "contextual information" is used to describe any information that can be used by context module 230 to define the virtual and/or physical environmental characteristics that a computing device, and the user of the computing device, may experience at a particular time. Examples of contextual information are numerous and may include: sensor information obtained by sensors (e.g., position sensors, accelerometers, gyros, barometers, ambient light sensors, proximity sensors, microphones, and any other sensor) of computing device 210, communication information (e.g., text based communications, audible communications, video communications, etc.) sent and received by communication modules of computing device 210, and application usage information associated with applications executing at computing device 210 (e.g., application data associated with applications, Internet search histories, text communications, voice and video communications, calendar information, social media posts and related information, etc.). Further examples of contextual information include signals and information obtained from transmitting devices that are external to computing device 210. For example, context module 230 may receive, via a radio or communication unit of computing device 210, beacon information transmitted from external beacons located at or near a physical location of a merchant.

One or more storage components 248 within computing device 210 may store information for processing during operation of computing device 210 (e.g., computing device 210 may store data accessed by modules 220, 222, 226, and 230 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Storage components 248 may store program instructions and/or information (e.g., data) associated with modules 220, 222, 226, and 230 and data store 224. Storage components 248 may include a memory configured to store data or other information associated with modules 220, 222, 226, and 230 and data store 224.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices (e.g., assistant server system 160 and/or search server system 180 of system 100 of FIG. 1) via one or more wired and/or wireless networks by transmitting and/or receiving network signals on one or more networks (e.g., network 130 of system 100 of FIG. 1). Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output components 246 of computing device 210 may generate output in a selected modality. Examples of modalities may include a tactile notification, audible notification, visual notification, machine generated voice notification, or other modalities. Output components 246 of computing device 210, in one example, includes a presence-sensitive display, sound card, video graphics adapter card, speaker, cathode ray tube (CRT) monitor, liquid crystal display (LCD), or any other type of device for generating output to a human or machine in a selected modality.

UID 212 of computing device 210 may be similar to UID 112 of computing device 110A and includes display component 202, presence-sensitive input component 204, microphone component 206, and speaker component 208. Display component 202 may be a screen at which information (e.g., a visual indication) is displayed by USD 212 while presence-sensitive input component 204 may detect an object at and/or near display component 202. Speaker component 208 may be a speaker from which audible information (e.g., an audible indication such as a machine generated voice notification) is played by UID 212 while microphone component 206 may detect audible input provided at and/or near display component 202 and/or speaker component 208.

While illustrated as an internal component of computing device 210, UID 212 may also represent an external component that shares a data path with computing device 210 for transmitting and/or receiving input and output. For instance, in one example, UID 212 represents a built-in component of computing device 210 located within and physically connected to the external packaging of computing device 210 (e.g., a screen on a mobile phone). In another example, UID 212 represents an external component of computing device 210 located outside and physically separated from the packaging or housing of computing device 210 (e.g., a monitor, a projector, etc. that shares a wired and/or wireless data path with computing device 210).

Speaker component 208 may comprise a speaker built into a housing of computing device 210 and in some examples, may be a speaker built into a set of wired or wireless headphones that are operably coupled to computing device 210. Microphone component 206 may detect audible input occurring at or near UID 212. Microphone component 206 may perform various noise cancellation techniques to remove background noise and isolate user speech from a detected audio signal.

UID 212 of computing device 210 may detect two-dimensional and/or three-dimensional gestures as input from a user of computing device 210. For instance, a sensor of UID 212 may detect a user's movement (e.g., moving a hand, an arm, a pen, a stylus, etc.) within a threshold distance of the sensor of UID 212. UID 212 may determine a two or three-dimensional vector representation of the movement and correlate the vector representation to a gesture input (e.g., a hand-wave, a pinch, a clap, a pen stroke, etc.) that has multiple dimensions. In other words, UID 212 can detect a multi-dimension gesture without requiring the user to gesture at or near a screen or surface at which UID 212 outputs information for display. Instead, UID 212 can detect a multi-dimensional gesture performed at or near a sensor which may or may not be located near the screen or surface at which UID 212 outputs information for display.

In operation, assistant module 222 may receive content for a conversation with a user of computing device 210. For example, assistant module 222 may receive content from one or more application modules 226. For instance, a shopping application of one or more application modules 226 may output, to assistant module 222, content indicating that a package was delivered to the user. In some examples, assistant module 222 may receive content from a text message received by computing device 210, an e-mail received by one or more application modules 226, or another module of computing device 210. In some examples, assistant module 222 may receive content from sources outside of computing device 210. For instance, assistant module 222 may receive, via network 130, content from search server system 180 of FIG. 1, computing device 110B of FIG. 1, assistant server system 160 of FIG. 1, or another device.

In response to receiving content, assistant module 222 may determine a list of surfaces configured to signal the content. For example, assistant module 222 of computing device 210 may determine whether one or more other computing devices (e.g., computing device 110 of FIG. 1) associated with the user and compatible with assistant module 222 are accessible. More specifically, assistant module 222 of computing device 210 may determine that a computing device is accessible when the computing device responds to an inquiry requesting confirmation that the computing device is available. For instance, assistant module 222 of computing device 210 may output an inquiry to computing device 110B of FIG. 1, and in response to receiving a response from computing device 110B that computing device 110B is available for signaling content, determine that computing device 110B is available. Similarly, remote assistant module 122B of FIG. 1 may determine whether one or more other computing devices (e.g., computing device 110 of FIG. 1) are accessible.

Assistant module 222 may select a surface from the list of surfaces for signaling the content. For example, assistant module 222 may select a surface based on a proximity of the surface to the user (e.g., positioned closest to the user). For instance, assistant module 222 may select computing device 210 when computing device 210 is a mobile device carried by the user or an automotive based computing device associated with a vehicle the user is traveling in while the user is commuting from work to home instead of a tablet at home or a work computer. In some examples, assistant module 222 may select a surface that most was most recently accessed by the user. For instance, assistant module 222 may select computing device 210 when computing device 210 is a multimedia device (e.g., tablet) currently being accessed (e.g., displaying a movie) by the user. In some examples, assistant module 222 may select a surface that is configured for a notification of the content being signal. For instance, assistant module 222 may select computing device 210 when computing device 210 is a multimedia device (e.g., television or a content streaming device operably coupled to a television) having a display capable of showing a flight reservation instead of a computing device that includes only a speaker and/or light array.

Assistant module 222 may select, for the selected surface, a modality to signal a conversation with the user. In some examples, assistant module 222 may select the modality for the selected surface based on a capability of the selected surface. For instance, assistant module 222 may determine that a selected surface that is a multimedia device (e.g., television) may only support visual notifications because the multimedia device is currently outputting sound for multimedia (e.g., a movie, television show, sporting event, etc.).

Assistant module 222 may select the modality for the selected surface based on a ranking of the content. For example, assistant module 222 may compare a ranking of the content with a threshold value associated with a modality. For instance, assistant module 222 may select a visual notification that is overlaid on video content currently being output by a multimedia device (e.g., television) when the ranking of the content satisfies (e.g., indicates a higher importance than the threshold) a threshold for a visual notification to be overlaid on video content. That is, assistant module 222 may overlay a visual notification for an expensive package delivery on video content output by a multimedia device (e.g., television) when the ranking of the content indicates a higher importance than the threshold for a visual notification to be overlaid on video content. However, assistant module 222 may refrain from overlaying a visual notification for a trivial package delivery on video content output by a multimedia device (e.g., television) when the ranking of the content indicates a lower importance than the threshold for a visual notification to be overlaid on video content.

Assistant module 222 may use a personalized ranking of types of information associated with the user that may be worthy of a proactive notification. That is, assistant module 222 may determine a ranking for content based on the information associated with the user. For example, based on information stored in user information data store 224, assistant module 222 may determine that a user values sports content as a high ranking type of information. In the example, assistant module 222 may be configured to increase a personalized ranking for sports content in response to determining that the user values sports content. In this manner, assistant module 222 may direct the user to meaningful sports content (e.g., nearby games, scores for favorite teams, team selection) as opposed to other types of information associated with a user. In addition to sports content, other types of information associated with a user may include weather information, news, travel information (e.g., flight, traffic, train, bus, etc.), notifications from software applications, package deliveries, or other types of information.

Assistant module 222 may use a generalized ranking for information that may be worthy of a prompting. That is, assistant module 222 may determine a ranking for content based on public information. For example, based on public information stored in search server system 180 of FIG. 1, assistant module 222 may determine that general users are querying for a specific term. For instance, in response to assistant module 222 determining that general users are querying for information for a musical event in the area, assistant module 222 may increase a generalized ranking for the musical event in the area. In this manner, assistant module 222 may direct the user to meaningful notifications based on other users. It should be understood that assistant module 222 may determine a ranking for content based on a combination of the public information and the information associated with the user.

In response to selecting the modality, assistant module 222 may signal the notification in the modality. For example, assistant module 222 may cause UID 212 to signal, in a selected modality, a conversation with a user. For instance, display component 202 may signal content visually by overlaying a message "Your package from company X has been delivered" on video content being displayed when the modality is selected as a visual indication.

Assistant module 222 may use a contextual ranking of types of information associated with the user that may be worthy of a proactive notification. For example, based on information received from contextual module 230, assistant module 222 may determine a contextual ranking of types of information associated with the user that may be worthy of a proactive notification. For instance, based on information received from contextual module 230, assistant module 222 may determine that a user is home and therefore more likely to find news content worthy than when the user is at work.

It should be understood that, in some examples, assistant module 222 may use a combination of rankings of content. For example, assistant module 222 may use a generalized ranking, personalized ranking, and a contextual ranking to select a modality and/or surface. In some examples, assistant module 222 may use a generalized ranking and personalized ranking to select a modality and/or surface. In some examples, assistant module 222 may use a generalized and contextual ranking to select a modality and/or surface. In some examples, assistant module 222 may use a personalized ranking and a contextual ranking to select a modality and/or surface.

In some examples, assistant module 222 may signal the notification in the modality without divulging the content. For instance, rather than overlaying a message "Your package from company X has been delivered" on video content being displayed, assistant module 222 may cause UID 212 to overlay a message "I have a notification for you. Pause the movie to if you want to hear it" on video content being displayed". In response to receiving an acknowledgment from the user (e.g., pausing the movie), assistant module 222 may signal the content. For instance, assistant module 222 may cause speaker component 208 to output "Your package from company X has been delivered."

Assistant module 222 may automatically select a voice user experience to inform a user of information in a useful manner. For example, assistant module 222 may select a length or detail level of a notification of content based on a ranking of the content. For instance, assistant module 222 may generate a longer message (e.g., Jon, your flight to Topeka is delayed by four hours. The new departure time is 7 pm." when a ranking for content signaled by the notification is high and a shorter message (e.g., your package arrives tomorrow." when a ranking for content signaled by the notification is low. Additionally, or alternatively, assistant module 222 may signal a set of notifications based on a ranking of the content for each notification of the set of notifications. For instance, assistant module 222 may collapse multiple notifications into a single message (e.g., Jon, you have four alerts. Your package is on time, your flight is still on time, and your credit card was paid.") when a ranking for each content signaled by the notification is low. In the example, in response to assistant module determining that content has a high ranking, assistant module 222 may optionally use a longer message to represent the notification compared with instances where assistant module 222 collapses the notification with other notifications. For instance, instead of assistant module 222 outputting "Your package is on time" to direct a user to information regarding a package delivery, assistant module 222 may output "Your package containing toothpicks will be on time, and should reach at 2 pm tomorrow" when assistant module 222 determines that the package is more important and/or not collapsed with other notifications into a single message.

Assistant module 222 may automatically suggest actions on behalf of the user. For example, assistant module 222 may determine using information associated with the user and/or public information a suggested action. For instance, in response to content indicating that a scheduled flight reservation was cancelled, assistant module 222 may suggest cancelling existing restaurant reservations. In instances where public information indicates that there is a storm warning, assistant module 222 may suggest a family-friendly movie to watch if it is a weekend evening.

Figure 3:
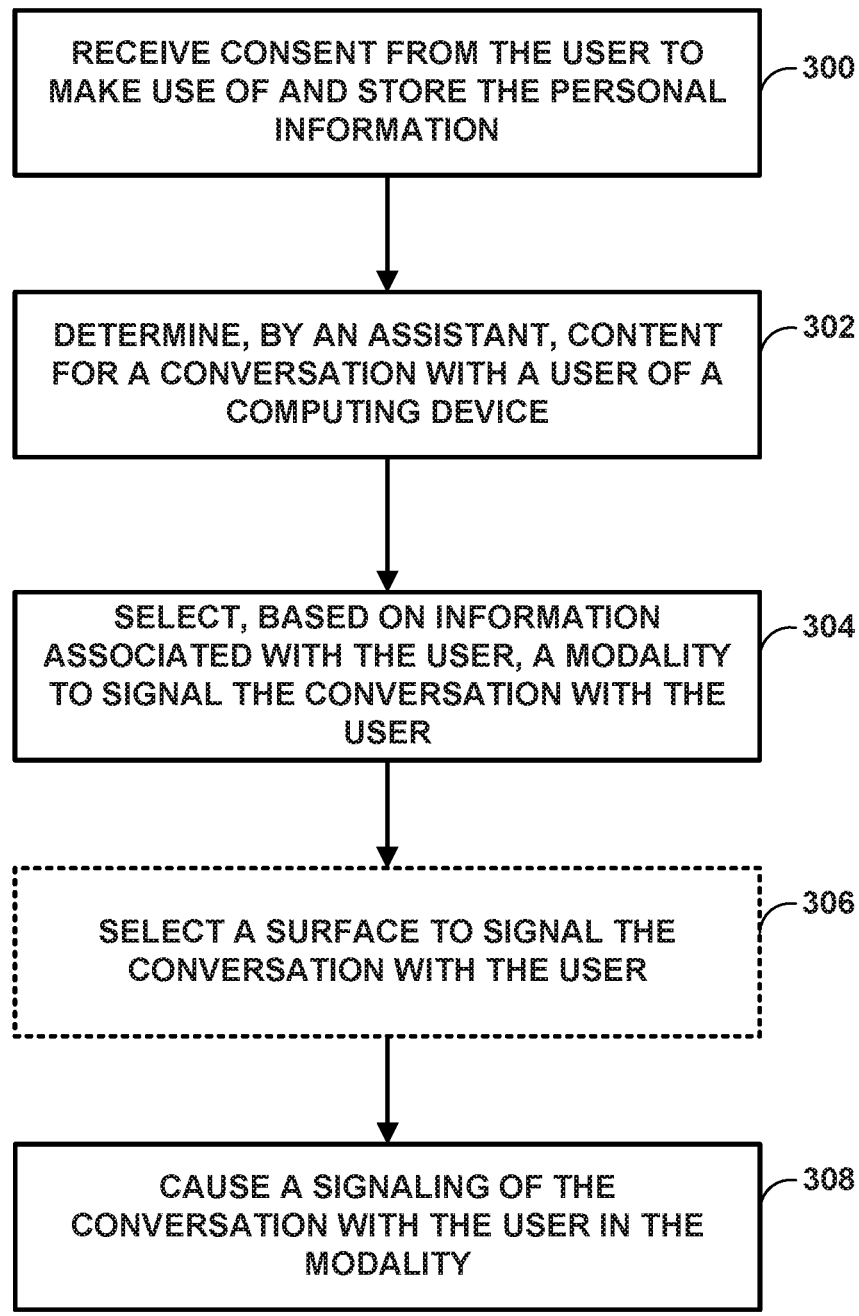
FIG. 3 is a flowchart illustrating example operations performed by one or more processors executing an example virtual assistant, in accordance with one or more aspects of the present disclosure.

FIG. 3 is a flowchart illustrating example operations performed by one or more processors executing an example virtual assistant, in accordance with one or more aspects of the present disclosure. FIG. 3 is described below in the context of system 100 of FIG. 1. For example, local assistant module 122A, while executing at one or more processors of computing device 110A, may perform operations 300-308, in accordance with one or more aspects of the present disclosure. And in some examples, remote assistant module 122B, while executing at one or more processors of assistant server system 160, may perform operations 300-308, in accordance with one or more aspects of the present disclosure. For purposes of illustration only, FIG. 3 is described below within the context of computing devices 110 of FIG. 1.

In operation, computing device 110 may receive consent from the user to make use of and store the personal information (300). For instance, in response to identifying potential personal information, local assistant module 122A may cause UI module 120 to request permission from the user to store and make use of personal information obtained during interactions with local assistant module 122A and the user.

It should be understood that computing device 110 may not require a user to consent prior to each time that local assistant module wants to make use of or store personal information. For example, if computing device 110 receives consent once a year, once a day, or even just one time (e.g., after initial product purchase, set up, etc.) computing device 110 may treat that prior consent as consent to make use and store personal information in the future. As one example of how a user may provide consent, the user may provide a voice input "yeah that's ok to store information about me" and in response to the voice input, local assistant module 122A may begin maintaining personal records about the user at data store 122A.

Computing device 110A may determine content for a conversation with a user of a computing device (302). For example, local assistant module 122A of computing device 110A may determine that a flight for the user of computing device 110A has been rescheduled. Computing device 110A may select, based on information associated with the user, a modality to signal initiating the conversation with the user (304). For instance, local assistant module 122A may select an audible notification as the modality to signal initiating the conversation with the user in response to determining that a content indicating that the flight for the user has a rank that is greater than a threshold corresponding to an audible notification. In some examples, local assistant module 122A may rank the content indicating the flight for the user based on the information associated with the user (e.g., a record of the assistant module 122 making the flight reservation, an e-mail confirming the flight reservation, etc.) and/or public information (e.g., public flight information indicating that the flight has been rescheduled).

Computing device 110A may optionally select a surface to signal initiating the conversation with the user (306). For instance, local assistant module 122A may select a surface from a list of surfaces when the surface is configured to output an audible notification as the modality signal and when the surface is likely to be proximate to the user (e.g., a home computing device when the user is home, a work computing device when a user is at work, a mobile computing device typically carried by a user, etc.).

Computing device 110A may cause a signaling of the conversation with the user in the modality (308). For example, local assistant module 122A may signal to the user that a content for a conversation is available by causing UI module 120 to output audio or text via UID 112 "I have a notification for you. Would you like to hear it?"

Figure 4:
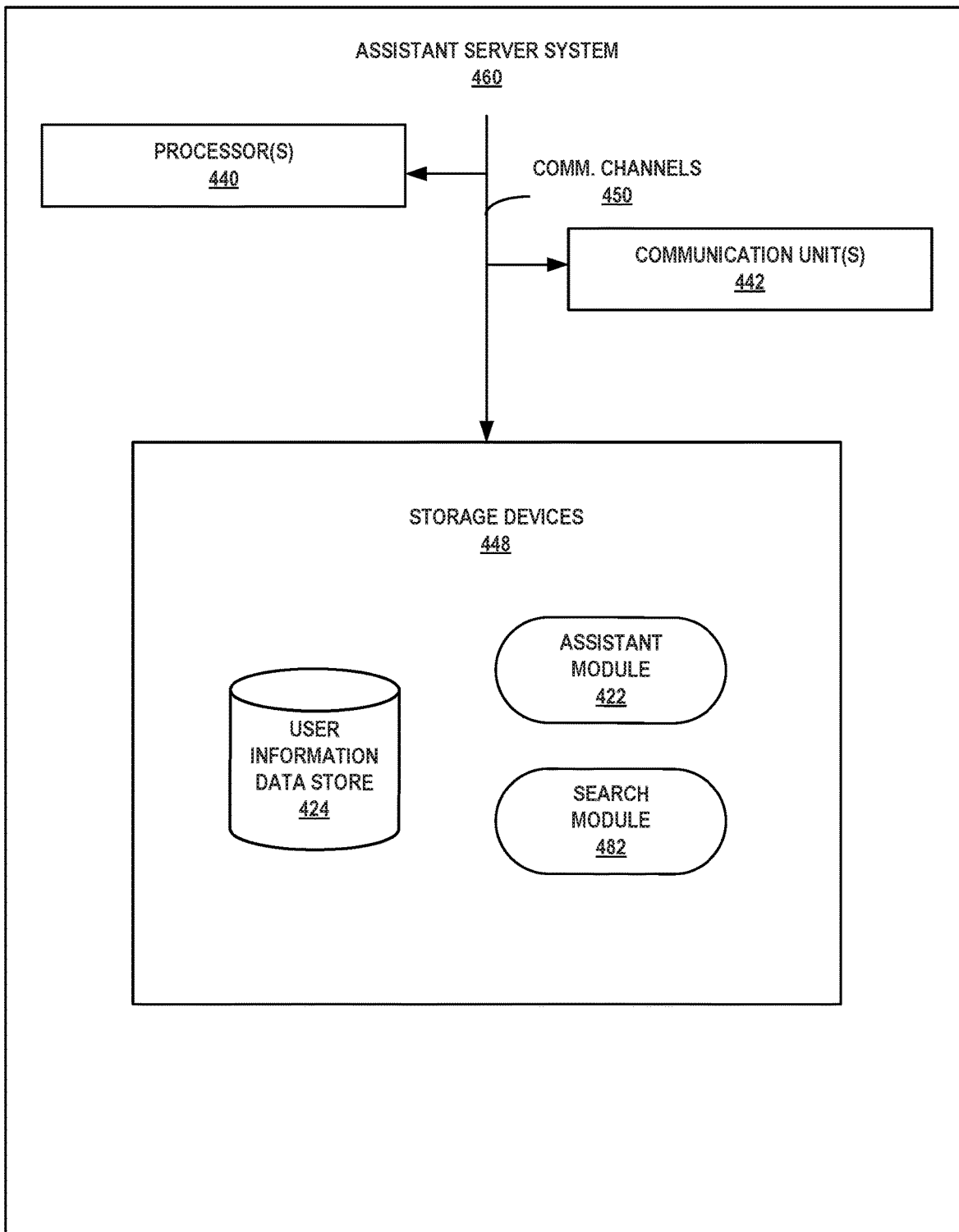
FIG. 4 is a block diagram illustrating an example computing device that is configured to execute an example virtual assistant, in accordance with one or more aspects of the present disclosure.

FIG. 4 is a block diagram illustrating an example computing system that is configured to execute an example virtual assistant, in accordance with one or more aspects of the present disclosure. Assistant server system 460 of FIG. 4 is described below as an example of assistant server system 160 of FIG. 1. FIG. 4 illustrates only one particular example of assistant server system 460, and many other examples of assistant server system 460 may be used in other instances and may include a subset of the components included in example assistant server system 460 or may include additional components not shown in FIG. 4.

As shown in the example of FIG. 4, assistant server system 460 includes one or more processors 440, one or more communication units 442, and one or more storage devices 448. Storage devices 448 include assistant module 422, user information data store 424, and search module 482.

Processors 440 are analogous to processors 240 of computing system 210 of FIG. 2. Communication units 442 are analogous to communication units 242 of computing system 210 of FIG. 2. Storage devices 448 are analogous to storage devices 248 of computing system 210 of FIG. 2. Communication channels 450 are analogous to communication channels 250 of computing system 210 of FIG. 2 and may therefore interconnect each of the components 440, 442, and 448 for inter-component communications. In some examples, communication channels 450 may include a system bus, a network connection, an inter-process communication data structure, or any other method for communicating data.

Search module 482 of assistant server system 460 is analogous to search module 182 of search server system 180 and may perform integrated search functions on behalf of assistant server system 460. That is, search module 482 may perform search operations on behalf of assistant module 422. In some examples, search module 482 may interface with external search systems, such as search system 180 to perform search operations on behalf of assistant module 422. When invoked, search module 482 may perform search functions, such as generating search queries and executing searches based on generated search queries across various local and remote information sources. Search module 482 may provide results of executed searches to the invoking component or module. That is, search module 482 may output search results to assistant module 422.

Assistant module 422 may include all functionality of local assistant module 122A and remote assistant module 122B of FIG. 1, as well as assistant module 222 of computing device 210 of FIG. 2. Assistant module 422 may perform similar operations as remote assistant module 122B for providing an assistant service that is accessible via assistant server system 460. That is, assistant module 422 act as an interface to a remote assistant service accessible to a computing device that is communicating over a network with assistant server system 460. For example, assistant module 422 may be an interface or API to remote assistant module 122B of assistant server system 160 of FIG. 1. For instance, assistant module 422 may select a surface and/or modality for signaling content.

User information data store 424 is analogous to user information data store 224 of FIG. 2 and is configured to store information associated by the user that assistant module 422 has learned about the user of a computing device during conversations between the user and an assistant provided by assistant module 422. Assistant module 422 may rely on the information stored at data store 424, to select a surface and/or modality for signaling content.

In operation, assistant module 422 may receive content for a conversation with a user of computing device 210. For example, assistant module 422 may receive content from search module 482. In response to receiving content, assistant module 422 may select a surface from the list of surfaces for signaling the content. For example, assistant module 422 may select a surface that was most recently accessed by the user.

Assistant module 422 may select a modality for the selected surface. For example, assistant module 422 may select the modality for the selected surface based on a ranking of the content. For example, assistant module 422 may compare a ranking of the content with a threshold value associated with a modality. For instance, assistant module 422 may select an audible notification when the ranking of the content satisfies (e.g., indicates a higher importance than the threshold) a threshold for an audible notification. That is, for instance, assistant module 422 may select an audible notification for an expensive package delivery when the ranking of the content indicates a higher importance than the threshold for an audible notification. However, assistant module 422 may select a visible notification (e.g., flashing a light indicator) for a trivial package delivery when the ranking of the content indicates a lower importance than the threshold for an audible notification. In this manner, the user may be made aware of meaningful information that may cause assistant module 422 to seem more useful and desirable to the user.

For example, the following represents various scenarios between a user of computing device 110 of FIG. 1 and an assistant provided by assistant module 422. For each scenario, there is some initial exchange of information between the user and the assistant, and one or more examples are provided indicating how this will impact the user's experience.

Clause 1. A method comprising: determining, by an assistant executing at one or more processors, content for a conversation with a user of a computing device; selecting, by the assistant, based on the content and information associated with the user, a modality to signal initiating the conversation with the user; and causing, by the assistant, in the modality, a signaling of the conversation with the user.

Clause 2. The method of clause 1, further comprising: determining, by the assistant, based on the information associated with the user, a ranking for the content, wherein selecting the modality to signal initiating the conversation with the user is further based on the ranking.

Clause 3. The method of any one of clauses 1-2, wherein determining the ranking for the content is further based on public information.

Clause 4. The method of any one of clauses 1-3, further comprising: selecting, by the assistant, based on the content and the information associated with the user, a surface for signaling the conversation to the user in the modality, wherein the signaling of the conversation is at the surface.

Clause 5. The method of any one of clauses 1-4, further comprising: determining, by the assistant, whether the surface is configured to signal initiating the conversation in the modality, wherein selecting the surface for signaling the conversation to the user in the modality is further based on the determination that the surface is configured to signal initiating the conversation in the modality.

Clause 6. The method of any one of clauses 1-5, wherein the modality includes an audible output.

Clause 7. The method of any one of clauses 1-6, wherein the conversation with the user is a subsequent conversation with the user, the method further comprising: receiving, by the assistant, an indication of an inquiry from the user; and responsive to receiving the indication of the inquiry from the user, outputting an indication of an initial conversation that indicates a reactive response to the inquiry from the user, wherein causing the signaling of the subsequent conversation with the user occurs after outputting the indication of the initial conversation that indicates the reactive response to the inquiry from the user.

Clause 8. The method of any one of clauses 1-7, wherein the assistant causes the signaling of the conversation with the user prior to receiving any indication of input from the user.

Clause 9. The method of any one of clauses 1-8, wherein the computing device comprises the one or more processors or a computing system comprises the one or more processors.

Clause 10. A computing device comprising: at least one processor; and at least one memory comprising instructions that when executed, cause the at least one processor to provide an assistant configured to: determine content for a conversation with a user of the computing device; select, based on the content and information associated with the user, a modality to signal initiating the conversation with the user; and cause, in the modality, a signaling of the conversation with the user.

Clause 11. The computing device of clause 10, wherein the assistant is further configured to: determine, based on the information associated with the user, a ranking for the content, wherein the assistant is further configured to select the modality to signal initiating the conversation with the user based on the ranking.

Clause 12. The computing device of any one of clauses 10-11, wherein the assistant is further configured to: determine the ranking for the content based on public information.

Clause 13. The computing device of any one of clauses 10-12, wherein the assistant is further configured to: select, based on the content and the information associated with the user, a surface for signaling the conversation to the user in the modality, wherein the assistant is further configured to cause the signaling of the conversation at the surface.

Clause 14. The computing device of any one of clauses 10-13, wherein the assistant is further configured to: determine whether the surface is configured to signal initiating the conversation in the modality, wherein the assistant is further configured to select the surface for signaling the conversation to the user in the modality based on the determination that the surface is configured to signal initiating the conversation in the modality.

Clause 15. The computing device of any one of clauses 10-14, wherein the modality includes an audible output.

Clause 16. The computing device of any one of clauses 10-15, wherein the conversation with the user is a subsequent conversation with the user, the assistant being further configured to: receive an indication of an inquiry from the user; and responsive to receiving the indication of the inquiry from the user, output an indication of an initial conversation that indicates a reactive response to the inquiry from the user, wherein the assistant is further configured to cause the signaling of the subsequent conversation with the user after outputting the indication of the initial conversation that indicates the reactive response to the inquiry from the user.

Clause 17. The computing device of any one of clauses 10-16, wherein the assistant is further configured to cause the signaling of the conversation with the user prior to receiving any indication of input from the user.

Clause 18. The computing device of any one of clauses 10-17, wherein the computing device comprises a mobile phone, a tablet computer, a computerized watch, a home assistant device, a television, a server, a laptop computer, a gaming system, or an automobile system.

Clause 19. A computer-readable storage medium comprising instructions that, when executed, cause at least one processor of an assistant server system to: determine content for a conversation with a user of a computing device; select, based on the content and information associated with the user, a modality to signal initiating the conversation with the user; and cause, in the modality, a signaling of the conversation with the user.

Clause 20. The computer-readable storage medium of clause 19, wherein the instructions, when executed, further cause the at least one processor to: determine, based on the information associated with the user, a ranking for the content, wherein the instructions, when executed, further cause the at least one processor to select the modality to signal initiating the conversation with the user based on the ranking.

Clause 21. The computer-readable storage medium of any one of clauses 19-20, wherein the instructions, when executed, further cause the at least one processor to: determine the ranking for the content further based on public information.

Clause 22. The computer-readable storage medium of any one of clauses 19-21, wherein the instructions, when executed, further cause the at least one processor to: select, based on the content and the information associated with the user, a surface for signaling the conversation to the user in the modality, wherein the instructions, when executed, further cause the at least one processor to cause the signaling of the conversation at the surface.

Clause 23. The computer-readable storage medium of any one of clauses 19-22, wherein the instructions, when executed, further cause the at least one processor to: determine whether the surface is configured to signal initiating the conversation in the modality, wherein the instructions, when executed, further cause the at least one processor to select the surface for signaling the conversation to the user in the modality based on the determination that the surface is configured to signal initiating the conversation in the modality.

Clause 24. The computer-readable storage medium of any one of clauses 19-23, wherein the modality includes an audible output.

Clause 25. The computer-readable storage medium of any one of clauses 19-24, wherein the conversation with the user is a subsequent conversation with the user and wherein the instructions, when executed, further cause the at least one processor to: receive an indication of an inquiry from the user; and responsive to receiving the indication of the inquiry from the user, output an indication of an initial conversation that indicates a reactive response to the inquiry from the user, wherein the instructions, when executed, further cause the at least one processor to cause the signaling of the subsequent conversation with the user after outputting the indication of the initial conversation that indicates the reactive response to the inquiry from the user.

Clause 26. The computer-readable storage medium of any one of clauses 19-25, wherein the instructions, when executed, further cause the at least one processor to cause the signaling of the conversation with the user prior to receiving any indication of input from the user.

Clause 27. A computing device comprising at least one processor and at least one memory comprising instructions that when executed, cause the at least one processor to perform the method of any one of clauses 1-9.

Clause 28. A computer-readable storage medium comprising instructions that, when executed cause at least one processor of a computing device to perform the method of any one of clauses 1-9.

Clause 29. A computing device comprising means for performing the method of any one of clauses 1-9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method implemented by one or more processors, the method comprising:
   maintaining a list of computing devices that are associated with a user and that each operate a respective local assistant module;
   generating, based on content for the user, a notification;
   selecting, based on the content, a modality to alert the user of the notification;
   receiving an indication of an inquiry from the user at the respective local assistant module of a given computing device of the computing devices of the list;
   responsive to receiving the indication of the inquiry from the user, causing a reactive response to the inquiry to be output at the respective local assistant module of the given computing device;
   responsive to receiving the indication of the inquiry from the user, causing the respective local assistant module of the given computing device to signal, at an end of the reactive response and in the modality, availability of the notification, wherein the content of the notification is unrelated to the reactive response; and
   responsive to additional input, at the respective local assistant module in response to the signaling, that indicates consent of the user, causing the notification to be rendered for presentation to the user by the respective local assistant module of the given computing device.

2. The method of claim 1, wherein generating the notification based on the content comprises determining a length of the notification based on information associated with the user and/or based on the content.

3. The method of claim 2, wherein determining the length of the notification based on information associated with the user and/or based on the content comprises:
   determining a ranking for the content based on the information associated with the user and/or based on the content; and
   selecting the length of the notification based on the ranking for the content.

4. The method of claim 2, wherein the length of the notification is indicative of a level of detail of the content for the notification.

5. The method of claim 1, wherein the modality to alert the user of the notification is one or both of: a light indicator and an audible indicator.

6. The method of claim 1, wherein signaling, at the end of the reactive response and in the modality, availability of the notification comprises notifying the user that the notification is available without providing the content of the notification.

7. A method comprising:
   determining, by an assistant executing at one or more processors, content for a conversation with a user of a computing device, wherein determining the content for the conversation with the user of the computing device comprises:
     determining, by the assistant, and based on an electronic communication sent to the user of the computing device, an intended action of the user is no longer available;
     determining, by the assistant, that the electronic communication, that indicates the intended action of the user is no longer available, has not been viewed by the user of the computing device; and
     including, by the assistant, and in the content of the conversation, an indication that the intended action of the user is no longer available based on the electronic communication having not been viewed by the user of the computing device;

maintaining, by the assistant, a list of computing devices that are associated with the user and that each operate a corresponding local assistant module;

selecting, by the assistant, based on the content for the conversation with the user, a modality to signal initiating of the conversation with the user, wherein the modality to signal initiating of the conversation with the user is one or both of: a light indicator and an audible indicator;

selecting, by the assistant, from the list of the computing devices, based on the selected modality and based on corresponding capabilities of each of the computing devices from the list, a given computing device to signal initiating of the conversation with the user in the selected modality; and causing, by the assistant, in the selected modality, a signaling of the conversation with the user via the given computing device, the signaling of the conversation occurring without providing the content for the conversation with the user.

8. The method of claim 7, further comprising:

subsequent to causing the signaling of the conversation without providing the content for the conversation with the user, receiving an indication, from the user via the given computing device, to initiate the conversation.

9. The method of claim 8, further comprising:

responsive to receiving the indication to initiate the conversation from the user via the given computing device, causing, by the assistant, the content of the conversation with the user to be provided via the given computing device.

10. The method of claim 9, wherein causing the content of the conversation with the user to be provided includes one or both of:

audibly rendering, via one or more speakers of the given computing device, the content of the conversation; and visually rendering, via a graphical user interface of the given computing device, the content of the conversation.

11. The method of claim 7, wherein determining the content for the conversation with the user of the computing device further comprises:

responsive to determining the intended action of the user is no longer available, determining, by the assistant, a suggested action for the user in lieu of the intended action of the user that is no longer available; and including, by the assistant, and in the content of the conversation, the suggested action for the user.

12. A computing system comprising:

at least one processor; and at least one memory comprising instructions that when executed, cause the at least one processor to provide an assistant configured to:

determine content for a conversation with a user of a computing device wherein the instructions to determine the content for the conversation with the user of the computing device comprise instructions to:

determine, based on an electronic communication sent to the user of the computing device, an intended action of the user is no longer available;

determine that the electronic communication, that indicates the intended action of the user is no longer available, has not been viewed by the user of the computing device; and include, in the content of the conversation, an indication that the intended action of the user is no longer available based on the electronic communication having not been viewed by the user of the computing device; and select, based on the content for the conversation with the user, a modality to signal initiating of the conversation with the user;

at least one database that maintains a list of computing devices that are associated with the user and that each operate a corresponding local assistant module; and the assistant further configured to:

select, from the list of the computing devices, based on the selected modality and based on corresponding capabilities of each of the computing devices from the list, a given computing device to signal initiating of the conversation with the user in the selected modality; and cause, in the selected modality, a signaling of the conversation with the user via the given computing device, the signaling of the conversation occurring without providing the content for the conversation with the user.

* * * * *